(12) United States Patent
Lee et al.

(10) Patent No.: US 10,882,377 B2
(45) Date of Patent: Jan. 5, 2021

(54) COOLING AND HEATING SYSTEM FOR VEHICLE

(71) Applicant: DOOWON CLIMATE CONTROL Co., Ltd., Asan-si (KR)

(72) Inventors: Won Suk Lee, Cheonan-si (KR); Chul Min Kim, Asan-si (KR); Youn Han Kim, Chungcheongnam-do (KR)

(73) Assignee: DOOWON CLIMATE CONTROL Co., Ltd., Asan-si (KR)

( * ) Notice: Subject to any disclaimer, the term of this patent is extended or adjusted under 35 U.S.C. 154(b) by 146 days.

(21) Appl. No.: 16/364,211

(22) Filed: Mar. 26, 2019

(65) Prior Publication Data

US 2019/0344636 A1   Nov. 14, 2019

(30) Foreign Application Priority Data

May 11, 2018  (KR) .......................... 10-2018-0054099

(51) Int. Cl.
*B60H 1/02*   (2006.01)
*B60H 1/00*   (2006.01)
*B60H 1/32*   (2006.01)

(52) U.S. Cl.
CPC ......... *B60H 1/00278* (2013.01); *B60H 1/323* (2013.01); *B60H 1/3228* (2019.05)

(58) Field of Classification Search
CPC ............ B60H 1/00278; B60H 1/00885; B60H 1/00921; B60H 1/3228; B60H 1/32284; B60H 1/323; B60H 2001/00307; B60H 2001/00928; B60H 2001/00949; Y02T 10/70

See application file for complete search history.

(56) References Cited

U.S. PATENT DOCUMENTS 9,744,827 B2 *  8/2017  Nishikawa ......... B60H 1/32284
9,796,241 B2 * 10/2017  Takeuchi ................ B60L 58/26
10,618,381 B2 *  4/2020  Kim .................... B60H 1/00271

FOREIGN PATENT DOCUMENTS

KR         10-1342931 B1    12/2013

* cited by examiner

*Primary Examiner* — Filip Zec
(74) *Attorney, Agent, or Firm* — Revolution IP, PLLC

(57) ABSTRACT

Provided is a cooling and heating system for a vehicle, in which a compressor, an indoor condenser, an outdoor condenser, and an evaporator are connected to a refrigerant circulation line in which a refrigerant is circulating, the cooling and heating system including: a waste heat chiller connected to the compressor through a first bypass line in the refrigerant circulation line; a battery chiller connected to the compressor through a second bypass line in the refrigerant circulation line; a first coolant line circulating a coolant by connecting the waste heat chiller to an electric radiator and an electric unit arranged adjacent to the outdoor condenser; a second coolant line spaced apart from the first coolant line and circulating the coolant by connecting the battery chiller to a battery of the vehicle; and a coolant control unit connecting the first coolant line and the second coolant line.

18 Claims, 7 Drawing Sheets

[FIG. 1]
- Conventional Art -
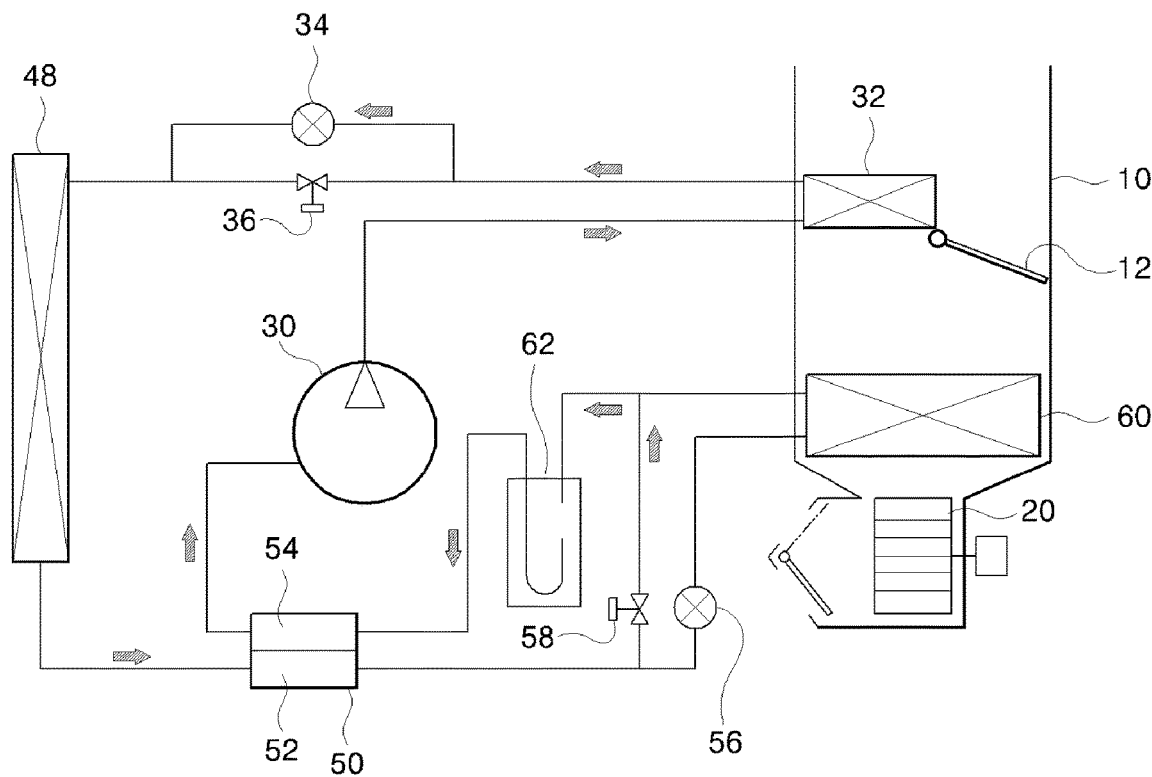

[FIG. 2]
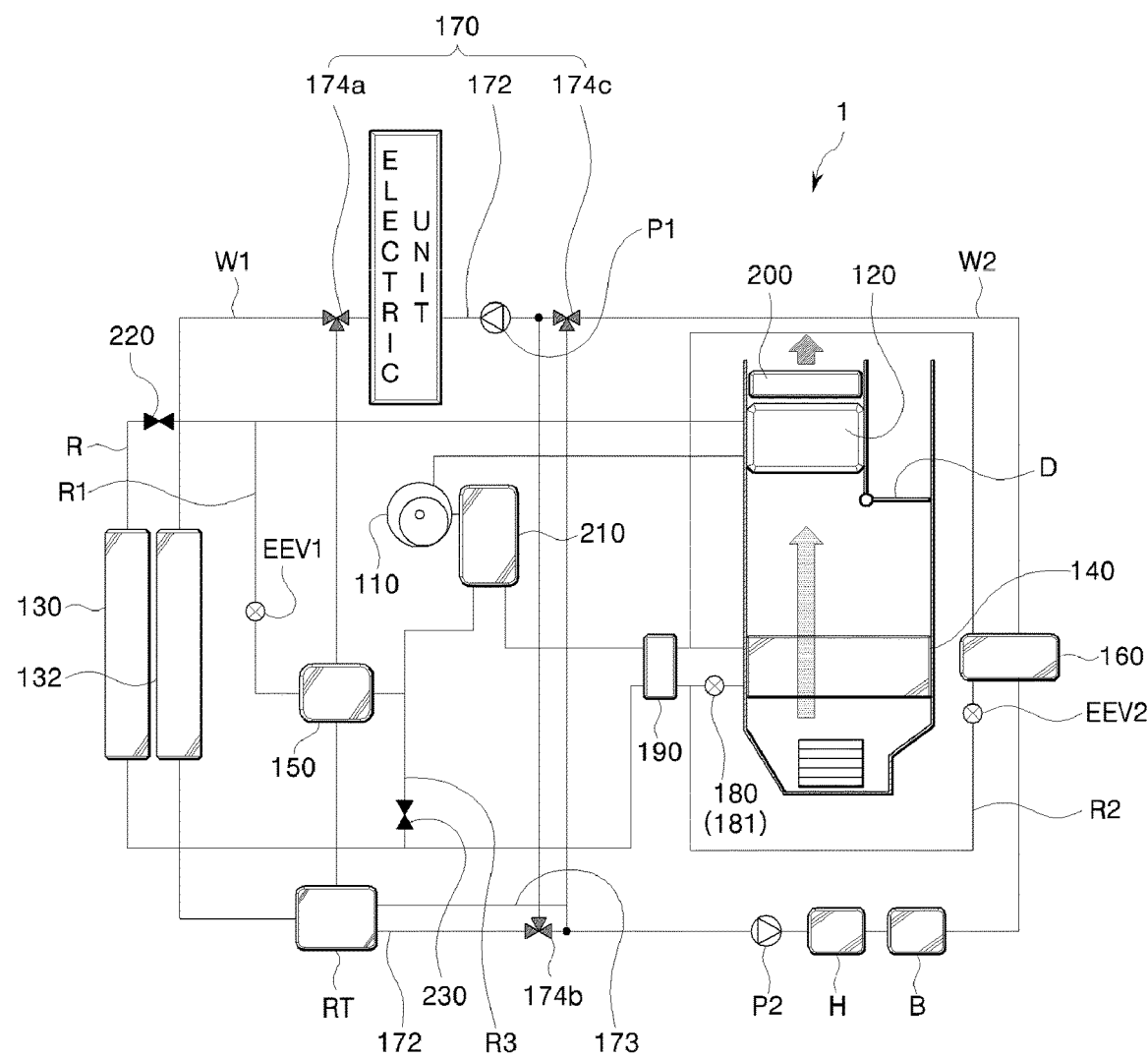

[FIG. 3]
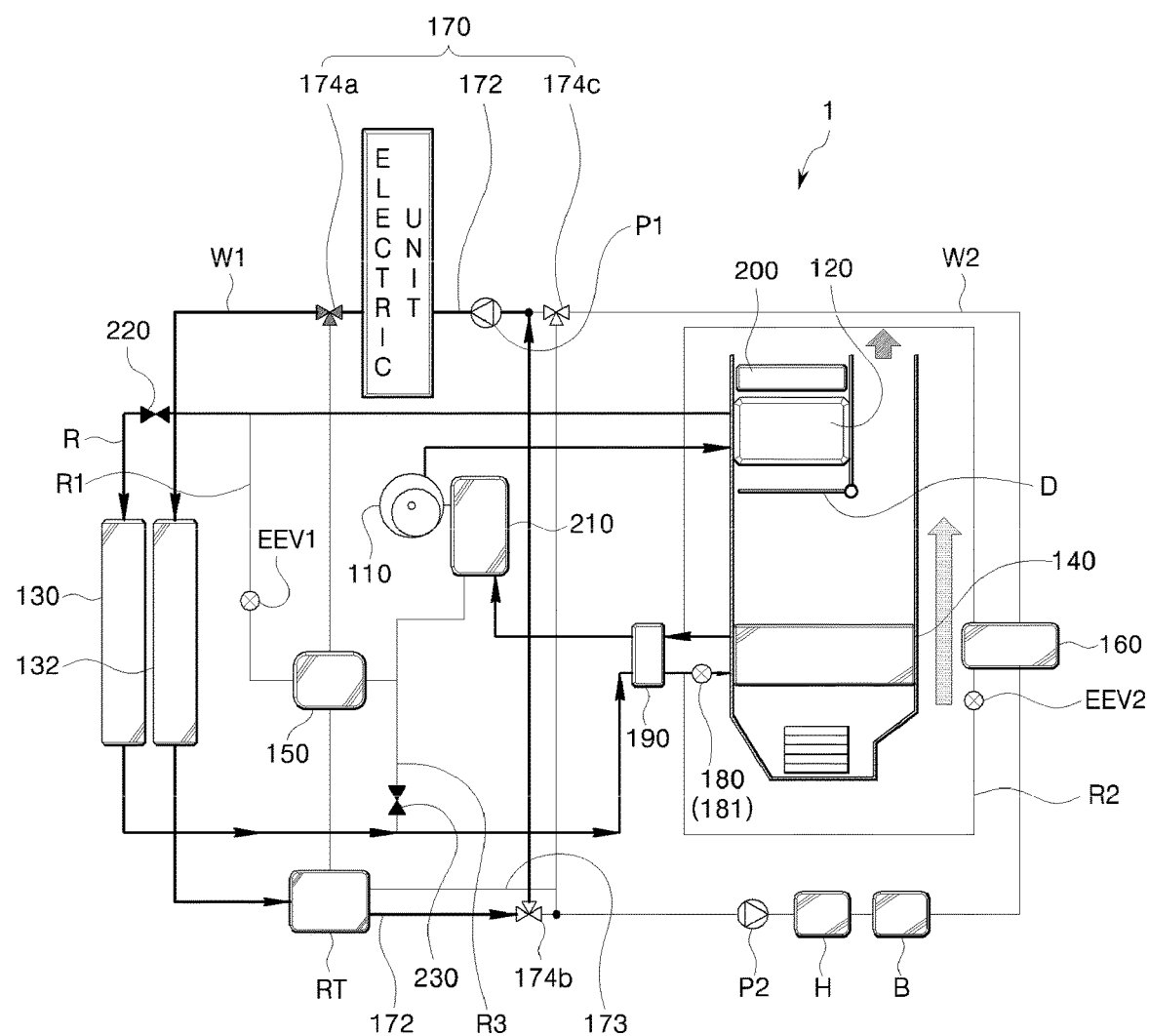

[FIG. 4]
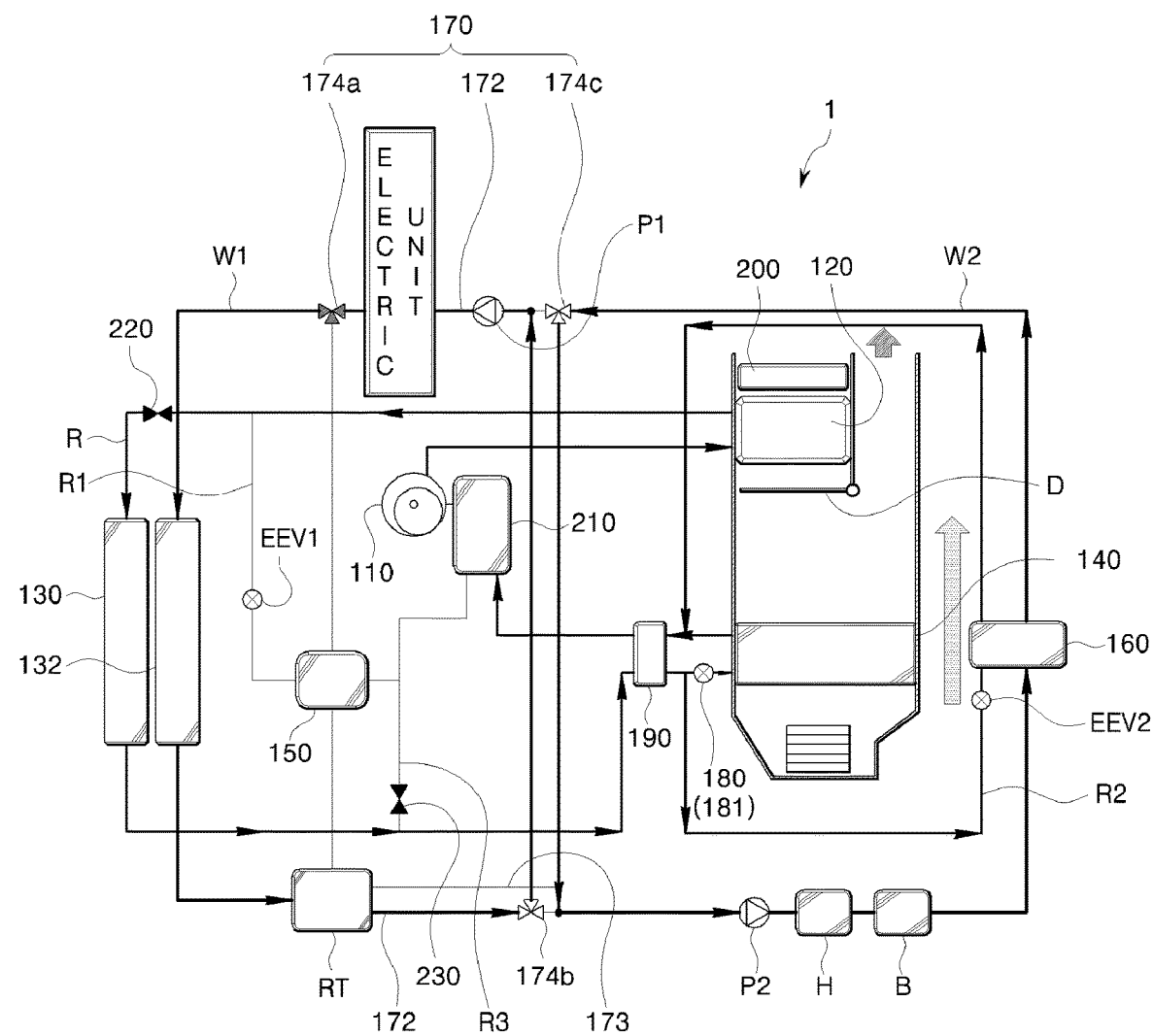

[FIG. 5]
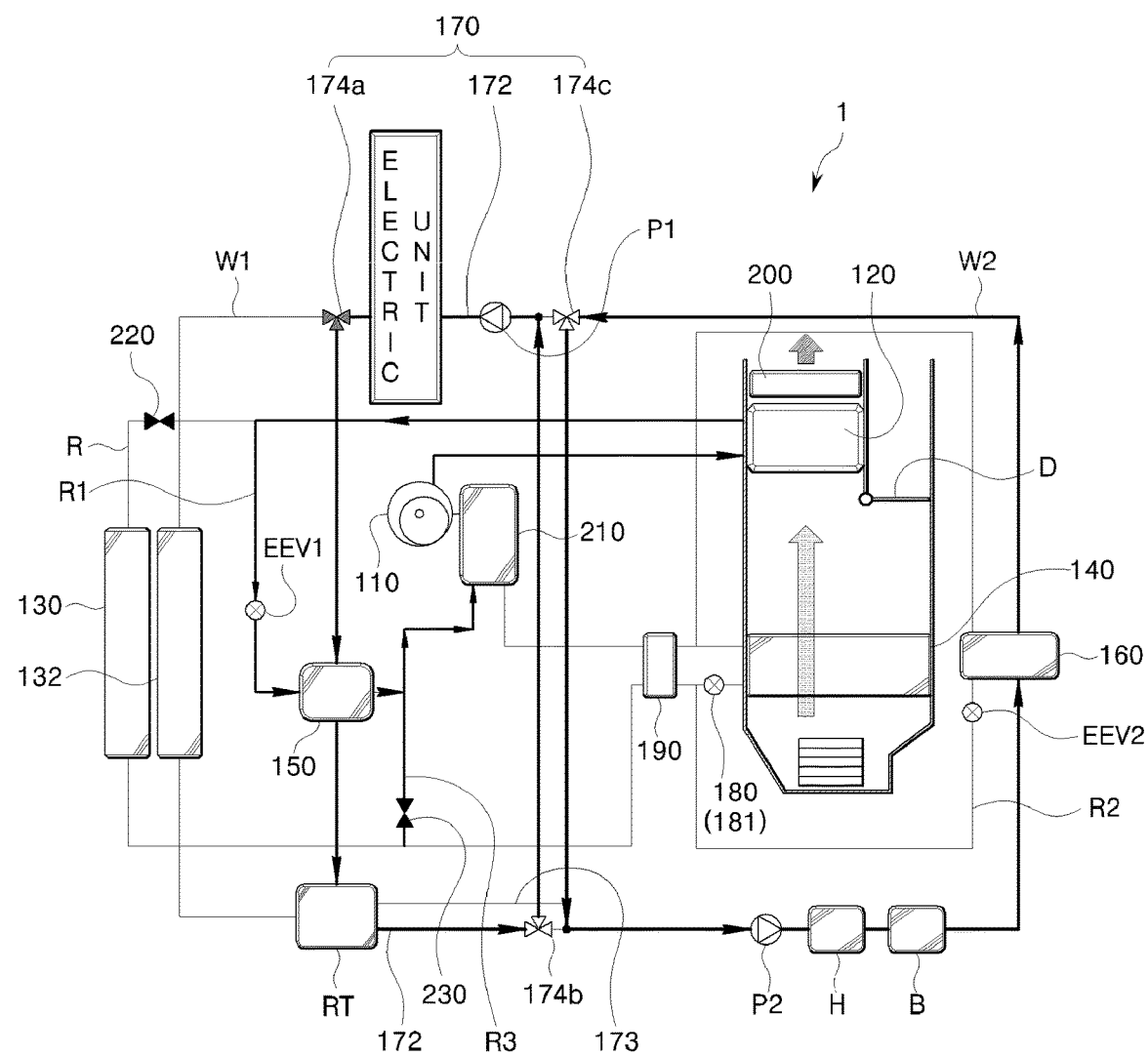

[FIG. 6]
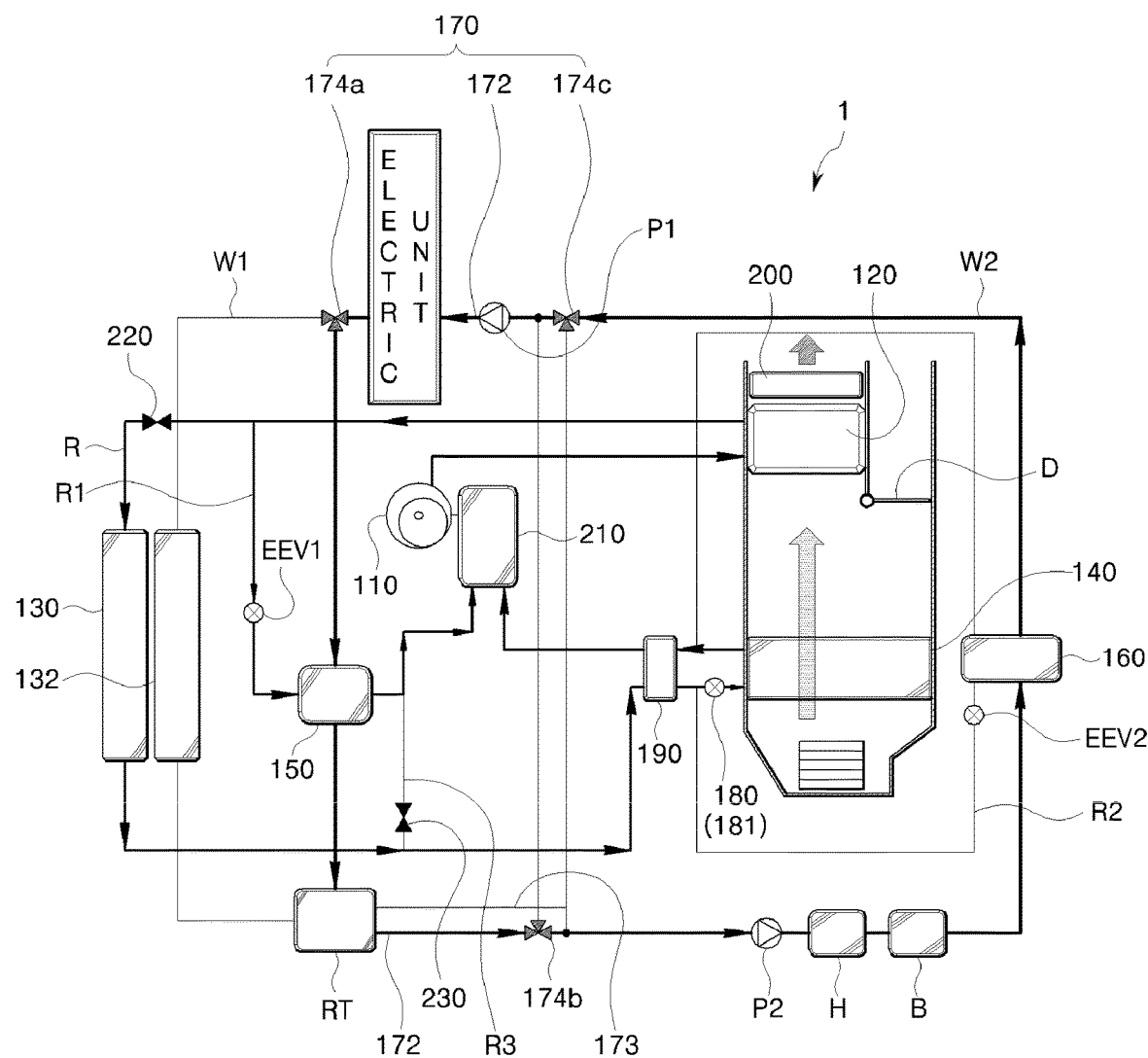

[FIG. 7]
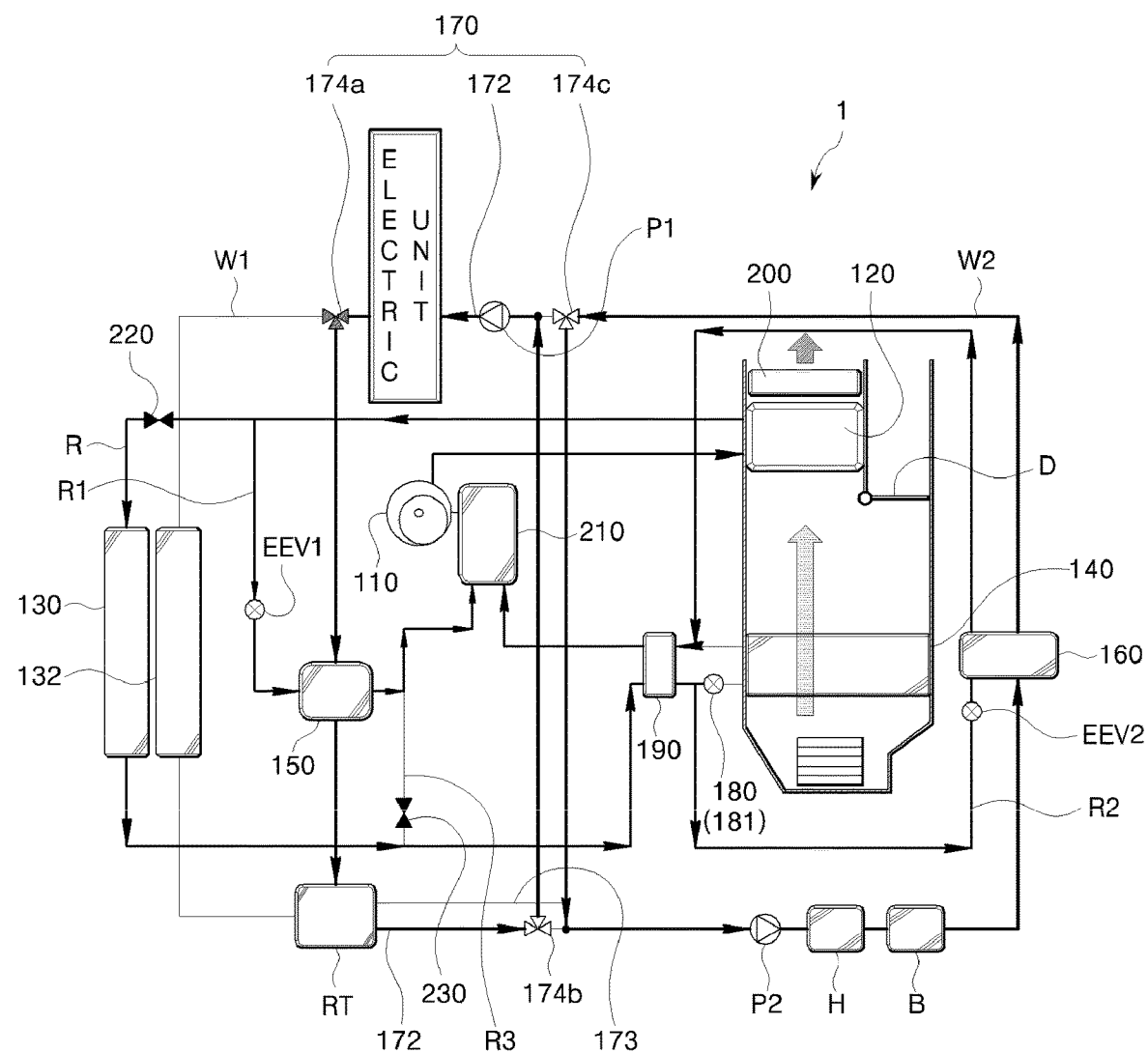

COOLING AND HEATING SYSTEM FOR VEHICLE

CROSS-REFERENCE TO RELATED APPLICATION

This application claims the benefit of Korean Patent Application No. 10-2018-0054099, filed on May 11, 2018, in the Korean Intellectual Property Office, the disclosure of which is incorporated herein in its entirety by reference.

BACKGROUND

1. Field

The present disclosure relates to a cooling and heating system for a vehicle, and more particularly, to a cooling and heating system for a vehicle, which is capable of heat management of a battery by providing a first coolant line connecting an electric radiator and a waste heat chiller and a second coolant line connecting a battery chiller and the battery away from the first coolant line, and providing a coolant control unit for controlling a flow of a coolant by connecting the first coolant line and the second coolant line to, via the waste heat chiller and the battery chiller, collect waste heat of the waste heat chiller and a refrigerant accumulated in an outdoor condenser and collect waste heat of the battery in a heating mode, and cool the battery by circulating the refrigerant that passed through the outdoor condenser to an evaporator and a compressor in a cooling mode.

2. Description of the Related Art

An air conditioning apparatus for a vehicle generally includes a cooling system for cooling the inside of the vehicle and a heating system for heating the inside of the vehicle. The cooling system is configured to cool the inside of the vehicle by changing the air passing through the outside of an evaporator to cool air via heat exchange with a refrigerant flowing through the inside of the evaporator, and the heating system is configured to heat the inside of the vehicle by changing the air passing the outside of a heater core at a heater core side of a coolant cycle to warm air via heat exchange with a coolant flowing through the inside of the heater core.

Meanwhile, a heat pump system capable of selectively performing cooling and heating by switching a flow direction of a refrigerant by using one refrigerant cycle may be applied apart from the air conditioning apparatus for a vehicle, and for example, includes two heat exchangers and a direction control valve capable of switching the flow direction of the refrigerant. Accordingly, cooling and heating are enabled according to the flow direction of the refrigerant by the direction control valve.

Various types of such a heat pump system for a vehicle have been proposed, and FIG. 1 illustrates a representative example.

A heat pump system for a vehicle shown in FIG. 1 includes a compressor 30 for compressing and discharging a refrigerant, an indoor heat exchanger 32 for radiating heat of the refrigerant discharged from the compressor 30, a first expansion valve 34 and a first bypass valve 36 provided in a parallel structure and for selectively passing the refrigerant that passed through the indoor heat exchanger 32, an outdoor heat exchanger 48 for performing heat exchange on the refrigerant that passed through the first expansion valve 34 or the first bypass valve 36, an evaporator 60 for evaporating the refrigerant that passed through the outdoor heat exchanger 48, an accumulator 62 for separating the refrigerant that passed through the evaporator 60 into a vapor refrigerant and a liquid refrigerant, an indoor heat exchanger 50 for exchanging heat between the refrigerant supplied to the evaporator and the refrigerant returned to the compressor 30, a second expansion valve 56 for selectively expanding the refrigerant supplied to the evaporator 60, and a second bypass valve 58 provided in parallel to the second expansion valve 56 and selectively connecting an outlet side of the outdoor heat exchanger 48 and an inlet side of the accumulator 62.

In FIG. 1, a reference numeral 10 denotes an air conditioning case in which the indoor heat exchanger 32 and the evaporator 60 are provided, a reference numeral 12 denotes a temperature control door for controlling a mixture amount of the cool air and the warm air, and a reference numeral 20 denotes a blower provided at an inlet of the air conditioning case.

According to a conventional heat pump system for a vehicle configured as described above, when a heating mode is activated, the first bypass valve 36 and the second expansion valve 56 are closed, and the first expansion valve 34 and the second bypass valve 58 are opened. Also, the temperature control door 12 operates as shown in FIG. 1. Accordingly, the refrigerant discharged from the compressor 30 returns to the compressor by sequentially passing through the indoor heat exchanger 32, the first expansion valve 34, the outdoor heat exchanger 48, a high-pressure portion 52 of the internal heat exchanger 50, the second bypass valve 58, the accumulator 62, and a low-pressure portion 54 of the internal heat exchanger 50. In other words, the indoor heat exchanger 32 functions as a heater and the outdoor heat exchanger 48 functions as an evaporator.

When a cooling mode is activated, the first bypass valve 36 and the second expansion valve 56 are opened, and the first expansion valve 34 and the second bypass valve 58 are closed. Also, the temperature control door 12 closes a passage of the indoor heat exchanger 32. Accordingly, the refrigerant discharged from the compressor 30 returns to the compressor 30 by sequentially passing through the indoor heat exchanger 32, the first bypass valve 36, the outdoor heat exchanger 48, the high-pressure portion 52 of the internal heat exchanger 50, the second expansion valve 56, the evaporator 60, the accumulator 62, and the low-pressure portion 54 of the internal heat exchanger 50. Here, the indoor heat exchanger 32 closed by the temperature control door 12 functions as a heater as in the heating mode.

However, according to the heat pump system for a vehicle, the indoor heat exchanger 32 provided inside the air conditioning case 10 functions as a heater, i.e., radiates heat to perform heating in the heating mode, while the outdoor heat exchanger 48 is provided outside the air conditioning case 10, i.e., at a front of an engine room of the vehicle, to function as an evaporator that performs heat exchange with outside air, i.e., to absorb heat.

Here, when an outside air temperature decreases below zero or frost accumulation occurs in the outdoor heat exchanger 48, the outdoor heat exchanger 48 hardly absorbs heat, and thus the temperature and pressure of the refrigerant in the heat pump system are decreased thereby deteriorating heating performance as a temperature of the air discharged into the vehicle is decreased.

In this regard, in KR 10-1342931, a defrost mode is performed during frost accumulation of an outdoor heat exchanger such that a refrigerant bypasses the outdoor heat exchanger and collects waste heat of a vehicle electric device through a heat supply means, thereby continue heating not only during the frost accumulation of the outdoor heat exchanger but also when an outdoor temperature is below zero.

However, in the conventional heat pump system, the refrigerant bypasses the outdoor heat exchanger and uses only the waste heat of the vehicle electric device as a heat source according to the frost accumulation of the outdoor heat exchanger or an outdoor temperature condition, and at this time, heating performance may deteriorate due to insufficient waste heat collected from the vehicle electric device.

Also, the conventional heat pump system only performs the cooling and heating modes and does not have a heat exchange function of a vehicle battery, and thus needs to include a separate device for battery cooling.

SUMMARY

Provided is a cooling and heating system for a vehicle, which is capable of heat management of a battery by providing a first coolant line connecting an electric radiator and a waste heat chiller and a second coolant line connecting a battery chiller and the battery away from the first coolant line, and connecting the first coolant line and the second coolant line to a coolant control unit to use waste heat of an electric unit, a refrigerant accumulated in an outdoor condenser, and waste heat of the battery via the waste heat chiller in a heating mode, thereby improving heating performance and to cool the battery via the battery chiller in a cooling mode.

Additional aspects will be set forth in part in the description which follows and, in part, will be apparent from the description, or may be learned by practice of the presented embodiments.

According to one or more embodiments, a cooling and heating system for a vehicle, in which a compressor, an indoor condenser, an outdoor condenser, and an evaporator are connected to a refrigerant circulation line in which a refrigerant is circulating, the cooling and heating system includes: a waste heat chiller connected to the compressor through a first bypass line in the refrigerant circulation line; a battery chiller connected to the compressor through a second bypass line in the refrigerant circulation line; a first coolant line circulating a coolant by connecting the waste heat chiller to an electric radiator and an electric unit arranged adjacent to the outdoor condenser; a second coolant line spaced apart from the first coolant line and circulating the coolant by connecting the battery chiller to a battery of the vehicle; and a coolant control unit connecting the first coolant line and the second coolant line and controlling a flow of the coolant circulating in the first coolant line and the second coolant line, wherein waste heat of the electric unit is collected, a refrigerant accumulated in the outdoor condenser is collected through a third bypass line, and waste heat of the battery is collected in a heating mode, and the battery is cooled by circulating the refrigerant that passed through the outdoor condenser in the evaporator and the battery chiller in a cooling mode to enable heat management of the battery.

The coolant control unit may include: a connection line connecting the first coolant line and the second coolant line to connect the electric radiator, the waste heat chiller, and the battery chiller in parallel; and a control valve controlling a flow of the coolant by being provided at the first coolant line circulating the coolant to the waste heat chiller and the second coolant line circulating the coolant to the battery chiller.

The connection line may connect the first coolant line connecting the electric radiator and the waste chiller and the second coolant line connecting the battery chiller and the battery in parallel.

The control valve may include: a first direction switching valve provided at a branch point between the first coolant line and the connection line at an inlet side of the waste heat chiller; a second direction switching valve provided at a branch point of the connection line connected to the first coolant line at an outlet side of the waste heat chiller; and a third direction switching valve provided at a branch point of the second coolant line at an outlet side of the battery chiller connected to the connection line.

A reservoir tank storing the coolant may be provided at the first coolant line, a first pump circulating the coolant may be provided at the connection line, and a second pump circulating the coolant may be provided at the second coolant line.

A bypass line connected to the second coolant line may be provided at the reservoir tank, and the first coolant line and the second coolant line may be connected by the bypass line such that the coolant overflowing from the first coolant line and the coolant overflowing from the second coolant line based on the reservoir tank may respectively flow to the second coolant line and the first coolant line. A heating unit heating the coolant circulating to the battery may be further provided at the second coolant line.

A first electromagnetic valve adjusting a flow rate of the refrigerant supplied to the waste heat chiller may be provided at the first bypass line connected to the waste heat chiller, and a second electromagnetic valve adjusting a flow rate of the refrigerant supplied to the battery chiller may be provided at the second bypass line connected to the battery chiller.

A temperature-sensitive expansion valve expanding the refrigerant according to a temperature of the refrigerant at an outlet of the evaporator may be provided at a front end of the evaporator of the refrigerant circulation line, wherein the temperature-sensitive expansion valve may include a first solenoid valve opening or closing the refrigerant circulation line connected to the evaporator.

An internal heat exchanger that exchanges heat between the refrigerant supplied to the evaporator by passing through the outdoor condenser and the refrigerant supplied to the compressor by passing through the evaporator may be provided on the refrigerant circulation line.

A PTC heater supplying an insufficient heat source may be provided adjacent to the indoor condenser, and an accumulator separating the refrigerant supplied to the compressor into a liquid refrigerant and a vapor refrigerant and supplying only the vapor refrigerant to the compressor may be provided adjacent to the compressor.

The first bypass line may be branched from the refrigerant circulation line between the indoor condenser and the outdoor condenser and connected to the waste heat chiller such that the refrigerant that passed through the indoor condenser may bypass the outdoor condenser, and a second solenoid valve opening or closing the refrigerant circulation line connected to the outdoor condenser may be provided on the refrigerant circulation line of a front end at an inlet side of the outdoor condenser.

A third solenoid valve opening or closing the third bypass line may be provided on the third bypass line such that the refrigerant supplied to the compressor may be selectively supplied from the refrigerant circulation line.

In the cooling mode, the first solenoid valve provided at a front end of the evaporator and the second solenoid valve provided at a front end of the outdoor condenser on the refrigerator circulation line may be opened, and a first electromagnetic valve provided at the first bypass line, the second electromagnetic valve provided at the second bypass line, and the third solenoid valve provided at the third bypass line may be closed.

In a battery cooling mode during the cooling mode, the first solenoid valve provided at a front end of the evaporator and the second solenoid valve provided at a front end of the outdoor condenser on the refrigerant circulation line may be opened, the first electromagnetic valve provided at the first bypass line and the third solenoid valve provided at the third bypass line may be closed, and the second electromagnetic valve provided at the second bypass line may be opened.

In the heating mode, the first solenoid valve provided at a front end of the evaporator and the second solenoid valve provided at a front end of the outdoor condenser on the refrigerant circulation line may be closed, the first electromagnetic valve provided at the first bypass line and the third solenoid valve provided at the third bypass line may be opened, and the second electromagnetic valve provided at the second bypass line may be closed.

In a dehumidification mode during the heating mode, the first solenoid valve provided at a front end of the evaporator and the second solenoid valve provided at a front end of the outdoor condenser on the refrigerant circulation line may be opened, the first electromagnetic valve provided at the first bypass line may be opened, and the second electromagnetic valve provided at the second bypass line and the third solenoid valve provided at the third bypass line may be closed.

In a battery cooling mode during the heating mode, the first solenoid valve provided at a front end of the evaporator on the refrigerant circulation line may be closed, the second solenoid valve provided at a front end of the outdoor condenser may be opened, the first electromagnetic valve provided at the first bypass line and the second electromagnetic valve provided at the second bypass line may be opened, and the third solenoid valve provided at the third bypass line may be closed.

BRIEF DESCRIPTION OF THE DRAWINGS

These and/or other aspects will become apparent and more readily appreciated from the following description of the embodiments, taken in conjunction with the accompanying drawings in which:

FIG. 1 is a configuration diagram of a conventional heat pump system for a vehicle;

FIG. 2 is a configuration diagram of a cooling and heating system for a vehicle, according to an embodiment of the present disclosure;

FIG. 3 is a diagram showing a state in which a refrigerant is circulating in a cooling mode of a cooling and heating system for a vehicle, according to the present disclosure;

FIG. 4 is a diagram showing a state in which a refrigerant is circulating in a battery cooling mode in a cooling mode of a cooling and heating system for a vehicle, according to the present disclosure;

FIG. 5 is a diagram showing a state in which a refrigerant is circulating in a heating mode of a cooling and heating system for a vehicle, according to the present disclosure;

FIG. 6 is a diagram showing a state in which a refrigerant is circulating in a dehumidification mode while a cooling and heating system for a vehicle is in a heating mode, according to the present disclosure; and FIG. 7 is a diagram showing a state in which a refrigerant is circulating in a battery cooling mode while a cooling and heating system for a vehicle is in a heating mode, according to the present disclosure.

DETAILED DESCRIPTION

Hereinafter, the present disclosure will be described more fully with reference to the accompanying drawings, in which exemplary embodiments of the disclosure are shown. The terms or words used herein must not be interpreted in their common or dictionary definitions, but must be interpreted in the meanings and concept corresponding to the aspect of the present disclosure, based on the principle that the inventor(s) can suitably define the concept of terms in order to describe the disclosure in the best manner.

Referring to FIGS. 2 through 7, a cooling and heating system 1 for a vehicle, according to an embodiment of the present disclosure may include a compressor 110, an indoor condenser 120, an outdoor condenser 130, an evaporator 140, a waste heat chiller 150, a battery chiller 160, a first coolant line W1, a second coolant line W2, and a coolant control unit 170, and may further include an expansion valve 180 including a first solenoid valve 181, an internal heat exchanger 190, a PTC heater 200, an accumulator 210, a second solenoid valve 220, and a third solenoid valve 230.

Referring to FIG. 2, the cooling and heating system 1 according to the present disclosure may be applied to an electric vehicle or a hybrid vehicle, and the compressor 110, the indoor condenser 120, the outdoor condenser 130, and the evaporator 140 may be connected to a refrigerant circulation line R in which a refrigerant circulates.

A first bypass line R1 bypassing the outdoor condenser 130 and the evaporator 140, and a second bypass line R2 and a third bypass line R3 bypassing the evaporator 140 are provided on the refrigerant circulation line R. The waste heat chiller 150 is provided at the first bypass line R1, the battery chiller 160 is provided at the second bypass line R2, and the third bypass line R3 connects the refrigerant circulation line R and the compressor 110 to each other.

The compressor 110 provided on the refrigerant circulation line R is driven upon receiving driving power from an engine, a motor, or the like, to suck and compress the refrigerant and then discharge the refrigerant in a gas state of a high temperature and high pressure.

The compressor 110 sucks and compresses the refrigerant discharged from the evaporator 140 and supplies the refrigerant to the indoor condenser 120 in a cooling mode, and sucks and compresses the refrigerant discharged from the outdoor condenser 130 and passed through the third bypass line R3 and supplies the refrigerant to the indoor condenser 120 in a heating mode.

In addition, in a dehumidification mode during the heating mode, the refrigerant discharged from the waste heat chiller 150 on the first bypass line R1 and the refrigerant discharged from the evaporator 140 after circulating the refrigerant circulation line R are sucked and compressed, and supplied to the indoor condenser 120.

The indoor condenser 120 is provided inside an air conditioning case C and in addition, connected to the refrigerant circulation line R at an outlet side of the compressor 110, thereby exchanging heat between the air flowing inside the air conditioning case C and the refrigerant discharged from the compressor 110.

The evaporator 140 is provided inside the air conditioning case C and connected to the refrigerant circulation line R at an inlet side of the compressor 110, thereby exchanging heat between the air flowing inside the air conditioning case C and the refrigerant flowing to the compressor 110.

The indoor condenser 120 functions as a condenser in the cooling mode and the heating mode, and the evaporator 140 functions as an evaporator in the cooling mode, is stopped in the heating mode because the refrigerant is not supplied, and functions as an evaporator in the dehumidification mode because the refrigerant is partially supplied.

The indoor condenser 120 and the evaporator 140 are spaced apart from each other at a certain interval inside the air conditioning case C, wherein the evaporator 140 and the indoor condenser 120 are sequentially provided from an upstream of an air flow direction in the air conditioning case C.

A temperature control door D is provided inside the air conditioning case C, wherein the temperature control door D is provided between the evaporator 140 and the indoor condenser 120 to control an amount of the air bypassing the indoor condenser 120 and an amount of the air passing the indoor condenser 120.

The temperature control door D controls the amounts of the air bypassing and passing the indoor condenser 120 to control a temperature of the air discharged from the air conditioning case C.

Referring to FIG. 3, in the cooling mode, when the temperature control door D completely closes a front passage of the indoor condenser 120, the cold air that passed through the evaporator 140 bypasses the indoor condenser 120 and is supplied into the vehicle, and thus maximum cooling is performed.

Referring to FIG. 5, in the heating mode, when a passage bypassing the indoor condenser 120 is completely closed through the temperature control door D, all the air passes through the indoor condenser 120 functioning as a condenser to be converted into the warm air, and the warm air is supplied into the vehicle and thus maximum heating is performed.

The waste heat chiller 150 is provided on the first bypass line R1 and the battery chiller 160 is provided on the second bypass line R2. The waste heat chiller 150 exchanges heat between the refrigerant flowing through the first bypass line R1 and the coolant circulating the first coolant line W1 described later, and the battery chiller 160 exchanges heat between the refrigerant flowing through the second bypass line R2 and the coolant circulating the second coolant line W2 described later.

In the cooling mode shown in FIG. 3, the refrigerant does not pass through the first and second bypass lines R1 and R2, but in a battery cooling mode during the cooling mode shown in FIG. 4, the refrigerant passes through the second bypass line R2 and at this time, the battery chiller 160 cools the coolant by exchanging heat between the refrigerant of the second bypass line R2 and the coolant of the second coolant line W2, thereby cooling a battery B, and thus heat management of the battery B is enabled.

Referring to FIG. 5, in the heating mode, the refrigerant passes through the first bypass line R1, and at this time, the waste heat chiller 150 exchanges heat between the refrigerant of the first bypass line R1 and the coolants circulating the first and second coolant lines W1 and W2, thereby using not only the waste heat of the waste heat chiller 150, but also the waste heat of the battery B, and thus heating performance is improved.

As such, the outdoor condenser 130 is able to use the waste heat of the waste heat chiller 150 and the waste heat of the battery B even in a mode in which the refrigerant bypasses the outdoor condenser 130, according to conditions of frost accumulation or outdoor temperature, and thus a change of an indoor discharge temperature due to insufficient heat source may be reduced.

An electric radiator 132, an electric unit, and the waste heat chiller 150 are connected by the first coolant line W1, the battery chiller 160 and the battery B of the vehicle are connected by the second coolant line W2, and the first coolant line W1 and the second coolant line W2 are connected by the coolant control unit 170.

A reservoir tank RT storing the coolant may be provided at the first coolant line W1, a second pump P2 circulating the coolant may be provided at the second coolant line W2, a first pump P1 circulating the coolant may be provided at a connection line 172 of the coolant control unit 170, and a bypass line 173 connected to the second coolant line W2 may be provided at the reservoir tank RT. The first coolant line W1 and the second coolant line W2 are connected by the bypass line 173, and the coolant overflowing from the first coolant line W1 flows to the second coolant line W2 and the coolant overflowing from the second coolant line W2 flows to the first coolant line W1, based on the reservoir tank RT.

The waste heat chiller 150, the electric radiator 132, and the reservoir tank RT may be sequentially connected in the first coolant line W1 in a coolant flow direction, the second pump P2, the battery B, and the battery chiller 160 may be sequentially connected in the second coolant line W2 in the coolant flow direction, and a heating unit H heating the coolant circulating the battery B may be provided at the second coolant line W2.

When the heating unit H is provided at the second coolant line W2, the coolant circulating the battery B is heated via the heating unit H and the temperature of the battery B is maintained optically in a condition where the temperature of the battery B needs to be increased, for example, when the outdoor temperature is low, such as below zero, thereby improving the efficiency of the battery B. An electric heater may be used as the heating unit H, and the heating unit H may be provided at the second coolant line W2 at an inlet side of the battery B. The electric unit includes a motor, a charger, an inverter, and an electric power control unit (EPCU) and may be provided at the connection line 172 described later.

The coolant control unit 170 controls a flow of the coolant circulating the first and second coolant lines W1 and W2, and includes the connection line 172 and a control valve 174a, 174b, 174c. By connecting the first and second coolant line W1 and W2, the waste heat of the electric unit and the battery B and the refrigerant accumulated in the outdoor condenser 130 are collected through the waste heat chiller 150 in the heating mode, and the battery B is cooled through the battery chiller 160 in the cooling mode to enable heat management of the battery B. The first pump P1 circulating the coolant may be provided at the connection line 172. The first pump P1 is not limited to being provided at the connection line 172, and may be provided at the first coolant line W1.

The coolant control unit 170 connects the first coolant line W1 and the second coolant line W2 in parallel. The connection line 172 of the coolant control unit 170 connects the outdoor condenser 130, the waste heat chiller 150, and the battery chiller 160 in parallel, and the control valve 174 is provided at the first coolant line W1 and the second coolant line W2 to control a flow of the coolant.

The connection line 172 includes a line connecting the first coolant line W1 connected to the reservoir tank RT and the second coolant line W2 connected to the inlet side of the battery B, and a line connecting the first coolant line W1 connected to an inlet side of the electric radiator 132 and the second coolant line W2 connected to an outlet side of the battery chiller 160, wherein the first coolant line W1 and the second coolant line W2 are connected in parallel.

The control valve 174 includes a first direction switching valve 174a provided at a branch point between the first coolant line W1 and the connection line 172 at an inlet side of the waste heat chiller 150, a second direction switching valve 174b provided at a branch point of the connection line 172 connected to the second coolant line W2 at an inlet side of the battery chiller 160, and a third direction switching valve 174c provided at a branch point of the second coolant line W2 at an outlet side of the battery chiller 160 connected to the connection line 172. The first through third direction switching valves 174a through 174c may be a three way valve.

A first electromagnetic valve EEV1 controlling a flow rate of the refrigerant supplied to the waste heat chiller 150 is provided on the first bypass line R1 connecting the refrigerant circulation line R and the waste heat chiller 150, and a second electromagnetic valve EEV2 controlling a flow rate of the refrigerant supplied to the battery chiller 160 is provided on the second bypass line R2 connecting the refrigerant circulation line R and the battery chiller 160.

Referring to FIGS. 3 and 4, in the cooling mode and in the battery cooling mode during the cooling mode, the first electromagnetic valve EEV1 closes the first bypass line R1, while the second electromagnetic valve EEV2 closes the second bypass line R2 in the cooling mode and opens the second bypass line R2 in the battery cooling mode during the cooling mode.

Referring to FIG. 2, the expansion valve 180 is provided on the refrigerant circulation line R. The expansion valve 180 is a temperature-sensitive valve provided at a front end of the evaporator 140 to expand the refrigerant according to the temperature of the refrigerant at the outlet of the evaporator 140, and may include the first solenoid valve 181 opening or closing the refrigerant circulation line R connected to the evaporator 140.

The internal heat exchanger 190 is provided on the refrigerant circulation line R, and exchanges heat between the refrigerant supplied to the evaporator 140 by passing through the outdoor condenser 130 and the refrigerant supplied to the compressor 110 by passing through the evaporator 140.

The PTC heater 200 is provided inside the air conditioning case C, is provided adjacent to the indoor condenser 120 to supply an insufficient heat source to the indoor condenser 120, and may be provided or removed as occasion demands.

The accumulator 210 is provided adjacent to the compressor 110, separates the refrigerant supplied to the compressor 110 into a liquid refrigerant and a vapor refrigerant, and supplies only the vapor refrigerant to the compressor 110.

The second solenoid valve 220 opening or closing the refrigerant circulation line R connected to the outdoor condenser 130 may be provided on the refrigerant circulation line R at a front end of an inlet side of the outdoor condenser 130, and the third solenoid valve 230 opening or closing the third bypass line R3 such that the refrigerant is selectively supplied from the refrigerant circulation line R to the compressor 110 may be provided at the third bypass line R3.

As shown in FIGS. 4, 6, and 7, the flow of refrigerant to the refrigerant circulation line R, the first bypass line R1, the second bypass line R2, and the third bypass line R3 and the flow of coolant between the first coolant line W1 and the second coolant line W2 may be variously controlled via control of the first solenoid valve 181, the second solenoid valve 220, the third solenoid valve 230, the first direction switching valve 174a, the second direction switching valve 174b, and the third direction switching valve 174c.

In the battery cooling mode during the cooling mode of FIG. 4, the coolant control unit 170 is controlled such that the coolant cooled in the electric radiator 132 cools the battery B by circulating the second coolant line W2 through the connection line 172 and the coolant cooled in the battery chiller 160 also cools the battery B by circulating to the battery B through the second coolant line W2.

In other words, the battery B is cooled by circulating the coolant cooled in the electric radiator 132 of the first coolant line W1 and the coolant cooled in the battery chiller 160 of the second coolant line W2 to the battery B, and at this time, the refrigerant and the coolant may not circulate towards the waste heat chiller 150.

In the dehumidification mode during the heating mode of FIG. 6, referring to the flow of coolant, the coolant control unit 170 may be controlled such that the coolant heated in the electric unit of the first coolant line W1 circulates the battery B of the second coolant line W2, the refrigerant may not circulate to the battery chiller 160, and the coolant may not circulate to the electric radiator 132.

In the battery cooling mode during the heating mode of FIG. 7, the coolant control unit 170 may be controlled such that the coolant heated in the electric unit of the first coolant line W1 and the coolant heated in the battery B of the second coolant line W2 circulate to the battery B of the second coolant line W2, the refrigerant may circulate to the battery chiller 160, and the coolant may not circulate to the electric radiator 132.

Operations of the cooling and heating system 1 for a vehicle, according to the present disclosure, will be described with reference to FIGS. 3 through 7.

In the cooling mode of FIG. 3, the flow of refrigerant cools the inside of the vehicle by circulating the compressor 110, the indoor condenser 120, the outdoor condenser 130, the evaporator 140, and then back to the compressor 110. Referring to the flow of coolant in the cooling mode, the coolant control unit 170 is controlled such that the coolant cooled in the electric radiator 132 of the first coolant line W1 circulates to the battery chiller 160 of the second coolant line W2.

In the battery cooling mode during the cooling mode of FIG. 4, the flow of refrigerant cools the inside of the vehicle by circulating the compressor 110 and the indoor condenser 120, wherein a portion of the refrigerator circulates the waste heat chiller 150 and the compressor 110 through the first bypass line R1 and the remaining portion of the refrigerator circulates the outdoor condenser 130 and the battery chiller 160 and compressor 110 through the second bypass line R2. Referring to the flow of coolant in the battery cooling mode during the cooling mode, the coolant control unit 170 is controlled such that the coolant cooled in the electric radiator 132 cools the battery B by circulating to the second coolant line W2 through the connection line 172 and the coolant cooled in the battery chiller 160 also cools the battery B by circulating the battery B of the second coolant line W2.

In the heating mode of FIG. 5, the inside of the vehicle is heated when the refrigerant circulates the compressor 110 and the indoor condenser 120, and the waste heat chiller 150 and the compressor 110 through the first bypass line R1, and the refrigerant accumulated in the outdoor condenser 130 circulates to the compressor 110 through the third bypass line R3. Referring to the flow of coolant in the heating mode, the coolant control unit 170 is controlled such that the coolant heated in the electric unit of the first coolant line W1 circulates to the battery chiller 160 of the second coolant line W2 and the coolant heated in the battery B of the second coolant line W2 circulates to the battery chiller 160.

In the dehumidification mode during the heating mode of FIG. 6, referring to the flow of refrigerant, the inside of the vehicle is dehumidified as the refrigerant circulates the compressor 110 and the indoor condenser 120, wherein a portion of the refrigerator circulates the waste heat chiller 150 and the compressor 110 through the first bypass line R1 and the remaining portion of the refrigerator circulates the compressor 110 through outdoor condenser 130 and the evaporator 140. In the dehumidification mode during the heating mode, referring to the flow of coolant, the coolant control unit 170 is controlled such that the coolant heated in the electric unit of the first coolant line W1 circulates to the battery B of the second coolant line W2, and the refrigerant may not circulate to the battery chiller 160 and the coolant may not circulate to the electric radiator 132.

In the battery cooling mode during the heating mode of FIG. 7, referring to the flow of refrigerant, the inside of the vehicle is heated as the refrigerant circulates the compressor 110 and the indoor condenser 120, wherein a portion of the refrigerator circulates the waste heat chiller 150 and the compressor 110 through the first bypass line R1, and the remaining portion of the refrigerator circulates the compressor 110 via the battery chiller 160 through outdoor condenser 130 and the second bypass line R2. In the battery cooling mode during the heating mode, referring to the flow of coolant, the coolant control unit 170 may be controlled such that the coolant heated in the electric unit of the first coolant line W1 circulates to the battery chiller 160 of the second coolant line W2, the coolant heated in the battery B of the second coolant line W2 circulates to the battery chiller 160, and the coolant does not circulate to the electric radiator 132.

Accordingly, by providing the first coolant line W1 connecting the electric radiator 132 and the waste heat chiller 150 and the second coolant line W2 spaced apart from the first coolant line W1 and connecting the battery chiller 160 and the battery B, and connecting the first and second coolant lines W1 and W2 to the coolant control unit 170, the heating performance may be improved since the waste heat of the electric unit, the refrigerant accumulated in the outdoor condenser 130, and the waste heat of the battery B are usable in the heating mode, and the heat management of the battery B is enabled since the battery B is cooled through the battery chiller 160 in the cooling mode.

Also, since not only the electric unit, but also the battery B are cooled through the electric radiator 132, a separate electric radiator for battery cooling is not necessary, thereby reducing a production cost. Also, since the battery B is not only cooled, but also heated by using the electric radiator 132, the battery chiller 160, and the heating unit H, the temperature of the battery B is maintained optically, thereby improving the efficiency of the battery B.

In a cooling and heating system for a vehicle according to the present disclosure, by providing a first coolant line connecting an electric radiator and a waste heat chiller and a second coolant line spaced apart from the first coolant line and connecting a battery chiller and a battery, and connecting the first and second coolant lines to a coolant control unit, heating performance can be improved since waste heat of an electric unit, a refrigerant accumulated in an outdoor condenser, and waste heat of the battery are usable in a heating mode, and heat management of the battery is enabled since the battery is cooled through the battery chiller in a cooling mode.

Also, since not only the electric unit, but also the battery are cooled through the electric radiator, a separate electric radiator for battery cooling is not necessary, thereby reducing a production cost. Also, since the battery is not only cooled, but also heated by using the electric radiator, the battery chiller, and a heating unit the temperature of the battery can maintained optically, thereby improving the efficiency of the battery.

While one or more embodiments have been described with reference to the figures, it will be understood by those of ordinary skill in the art that various changes in form and details may be made therein without departing from the spirit and scope of the disclosure as defined by the following claims.

What is claimed is:

1. A cooling and heating system for a vehicle, in which a compressor, an indoor condenser, an outdoor condenser, and an evaporator are connected to a refrigerant circulation line in which a refrigerant is circulating, the cooling and heating system comprising:
    a waste heat chiller connected to the compressor through a first bypass line in the refrigerant circulation line;
    a battery chiller connected to the compressor through a second bypass line in the refrigerant circulation line;
    a first coolant line circulating a coolant by connecting the waste heat chiller to an electric radiator and an electric unit arranged adjacent to the outdoor condenser;
    a second coolant line spaced apart from the first coolant line and circulating the coolant by connecting the battery chiller to a battery of the vehicle; and
    a coolant control unit connecting the first coolant line and the second coolant line and controlling a flow of the coolant circulating in the first coolant line and the second coolant line,
    wherein waste heat of the electric unit is collected, a refrigerant accumulated in the outdoor condenser is collected through a third bypass line, and waste heat of the battery is collected in a heating mode, and the battery is cooled by circulating the refrigerant that passed through the outdoor condenser in the evaporator and the battery chiller in a cooling mode to enable heat management of the battery.

2. The cooling and heating system of claim 1, wherein the coolant control unit comprises:
    a connection line connecting the first coolant line and the second coolant line to connect the electric radiator, the waste heat chiller, and the battery chiller in parallel; and
    a control valve controlling a flow of the coolant by being provided at the first coolant line circulating the coolant to the waste heat chiller and the second coolant line circulating the coolant to the battery chiller.

3. The cooling and heating system of claim 2, wherein the connection line connects the first coolant line connecting the electric radiator and the waste chiller and the second coolant line connecting the battery chiller and the battery in parallel.

4. The cooling and heating system of claim 3, wherein the control valve comprises:
   a first direction switching valve provided at a branch point between the first coolant line and the connection line at an inlet side of the waste heat chiller;
   a second direction switching valve provided at a branch point of the connection line connected to the first coolant line at an outlet side of the waste heat chiller; and
   a third direction switching valve provided at a branch point of the second coolant line at an outlet side of the battery chiller connected to the connection line.

5. The cooling and heating system of claim 2, wherein a reservoir tank storing the coolant is provided at the first coolant line, a first pump circulating the coolant is provided at the connection line, and a second pump circulating the coolant is provided at the second coolant line.

6. The cooling and heating system of claim 5, wherein a bypass line connected to the second coolant line is provided at the reservoir tank, and the first coolant line and the second coolant line are connected by the bypass line such that the coolant overflowing from the first coolant line and the coolant overflowing from the second coolant line based on the reservoir tank respectively flow to the second coolant line and the first coolant line.

7. The cooling and heating system of claim 5, wherein a heating unit heating the coolant circulating to the battery is further provided at the second coolant line.

8. The cooling and heating system of claim 1, wherein a first electromagnetic valve adjusting a flow rate of the refrigerant supplied to the waste heat chiller is provided at the first bypass line connected to the waste heat chiller, and
   a second electromagnetic valve adjusting a flow rate of the refrigerant supplied to the battery chiller is provided at the second bypass line connected to the battery chiller.

9. The cooling and heating system of claim 8, wherein a temperature-sensitive expansion valve expanding the refrigerant according to a temperature of the refrigerant at an outlet of the evaporator is provided at a front end of the evaporator of the refrigerant circulation line,
   wherein the temperature-sensitive expansion valve comprises a first solenoid valve opening or closing the refrigerant circulation line connected to the evaporator.

10. The cooling and heating system of claim 9, wherein an internal heat exchanger that exchanges heat between the refrigerant supplied to the evaporator by passing through the outdoor condenser and the refrigerant supplied to the compressor by passing through the evaporator is provided on the refrigerant circulation line.

11. The cooling and heating system of claim 10, wherein a PTC heater supplying an insufficient heat source is provided adjacent to the indoor condenser, and
   an accumulator separating the refrigerant supplied to the compressor into a liquid refrigerant and a vapor refrigerant and supplying only the vapor refrigerant to the compressor is provided adjacent to the compressor.

12. The cooling and heating system of claim 11, wherein the first bypass line is branched from the refrigerant circulation line between the indoor condenser and the outdoor condenser and connected to the waste heat chiller such that the refrigerant that passed through the indoor condenser bypasses the outdoor condenser, and
   a second solenoid valve opening or closing the refrigerant circulation line connected to the outdoor condenser is provided on the refrigerant circulation line of a front end at an inlet side of the outdoor condenser.

13. The cooling and heating system of claim 12, wherein a third solenoid valve opening or closing the third bypass line is provided on the third bypass line such that the refrigerant supplied to the compressor is selectively supplied from the refrigerant circulation line.

14. The cooling and heating system of claim 13, wherein, in the cooling mode, the first solenoid valve provided at a front end of the evaporator and the second solenoid valve provided at a front end of the outdoor condenser on the refrigerator circulation line are opened, and a first electromagnetic valve provided at the first bypass line, the second electromagnetic valve provided at the second bypass line, and the third solenoid valve provided at the third bypass line are closed.

15. The cooling and heating system of claim 13, wherein, in a battery cooling mode during the cooling mode, the first solenoid valve provided at a front end of the evaporator and the second solenoid valve provided at a front end of the outdoor condenser on the refrigerant circulation line are opened, the first electromagnetic valve provided at the first bypass line and the third solenoid valve provided at the third bypass line are closed, and the second electromagnetic valve provided at the second bypass line is opened.

16. The cooling and heating system of claim 13, wherein, in the heating mode, the first solenoid valve provided at a front end of the evaporator and the second solenoid valve provided at a front end of the outdoor condenser on the refrigerant circulation line are closed, the first electromagnetic valve provided at the first bypass line and the third solenoid valve provided at the third bypass line are opened, and the second electromagnetic valve provided at the second bypass line are closed.

17. The cooling and heating system of claim 13, wherein, in a dehumidification mode during the heating mode, the first solenoid valve provided at a front end of the evaporator and the second solenoid valve provided at a front end of the outdoor condenser on the refrigerant circulation line are opened, the first electromagnetic valve provided at the first bypass line is opened, and the second electromagnetic valve provided at the second bypass line and the third solenoid valve provided at the third bypass line are closed.

18. The cooling and heating system of claim 13, wherein, in a battery cooling mode during the heating mode, the first solenoid valve provided at a front end of the evaporator on the refrigerant circulation line is closed, the second solenoid valve provided at a front end of the outdoor condenser is opened, the first electromagnetic valve provided at the first bypass line and the second electromagnetic valve provided at the second bypass line are opened, and the third solenoid valve provided at the third bypass line is closed.

* * * * *